US012162787B2

(12) United States Patent
Herrmann

(10) Patent No.: US 12,162,787 B2
(45) Date of Patent: Dec. 10, 2024

(54) AUGER SCREEN WITH ADJUSTABLE LENGTH PRESS ZONE

(71) Applicant: PARKSON CORPORATION, Fort Lauderdale, FL (US)

(72) Inventor: Philip C. Herrmann, Grayslake, IL (US)

(73) Assignee: PARKSON CORPORATION, Fort Lauderdale, FL (US)

( * ) Notice: Subject to any disclaimer, the term of this patent is extended or adjusted under 35 U.S.C. 154(b) by 476 days.

(21) Appl. No.: 17/156,797

(22) Filed: Jan. 25, 2021

(65) Prior Publication Data

US 2021/0230038 A1    Jul. 29, 2021

Related U.S. Application Data

(60) Provisional application No. 62/967,114, filed on Jan. 29, 2020.

(51) Int. Cl.
*C02F 11/125*    (2019.01)
*B30B 9/12*    (2006.01)
*B30B 9/14*    (2006.01)

(52) U.S. Cl.
CPC ............ *C02F 11/125* (2013.01); *B30B 9/128* (2013.01); *B30B 9/14* (2013.01)

(58) Field of Classification Search
CPC ....... C02F 11/125; C02F 11/00; C02F 11/121; C02F 2303/24; B30B 9/128; B30B 9/14; B30B 9/18; B30B 9/00; B30B 9/12
USPC .......................................... 210/405
See application file for complete search history.

(56) References Cited

U.S. PATENT DOCUMENTS

| | | | |
|---|---|---|---|
| 2002/0050214 A1* | 5/2002 | Thibodeau | B30B 9/12 100/127 |
| 2013/0312624 A1* | 11/2013 | Cone | B30B 9/125 100/37 |
| 2019/0210314 A1* | 7/2019 | Sands | B30B 9/127 |
| 2019/0374883 A1* | 12/2019 | Gallop | B01D 29/23 |

* cited by examiner

*Primary Examiner* — Akash K Varma
(74) *Attorney, Agent, or Firm* — Tarolli, Sundheim, Covell & Tummino LLP

(57) ABSTRACT

A dewatering device for removing entrained solids and debris from a liquid stream includes a housing defining a chamber. An auger has a first end positioned outside the chamber and a second end positioned inside the chamber. A compaction zone includes a first tube fixed to the housing. A second tube is slidably mounted on the first tube. A partition is secured to the second tube and has a first longitudinal position in the housing allowing a solids plug to form in the compaction zone and a second longitudinal position in the housing preventing the solids plug from forming in the compaction zone.

14 Claims, 7 Drawing Sheets

AUGER SCREEN WITH ADJUSTABLE LENGTH PRESS ZONE

RELATED APPLICATIONS

This application claims the benefit of U.S. Provisional Appln. Ser. No. 62/967,114, filed Jan. 29, 2020, the entirety of which is incorporated by reference herein.

TECHNICAL FIELD

The present invention relates generally to dewatering, and specifically to an auger and adjustable compaction cylinder for a dewatering device.

BACKGROUND

A dewatering screen compresses solids as they move toward the discharge. The more compacted solids that are near the discharge aid in further compaction of the solids. For applications that have a high percentage of stringy solids, such as sanitary wipes, the solids plug can constrict around the drive shaft, increase the conveying force, and block the solids discharge zone.

SUMMARY

In one example, a dewatering device for removing entrained solids and debris from a liquid stream includes a housing defining a chamber. An auger has a first end positioned outside the chamber and a second end positioned inside the chamber. A compaction zone includes a first tube fixed to the housing. A second tube is slidably mounted on the first tube. A partition is secured to the second tube and has a first longitudinal position in the housing allowing a solids plug to form in the compaction zone and a second longitudinal position in the housing preventing the solids plug from forming in the compaction zone.

In another example, a dewatering device for removing entrained solids and debris from a liquid stream includes a housing defining a chamber and having mounting holes corresponding with first and second longitudinal positions. An auger has a first end positioned outside the chamber and a second end positioned inside the chamber. A compaction zone includes a first tube fixed to the housing. A second tube is slidably mounted on the first tube in a telescoping manner. A partition is secured to the second tube. The partition is placed in the first longitudinal position to allow a solids plug to form in the compaction zone and the second longitudinal position to prevent the solids plug from forming in the compaction zone.

Other objects and advantages and a fuller understanding of the invention will be had from the following detailed description and the accompanying drawings.

DETAILED DESCRIPTION

The present invention relates generally to dewatering, and specifically to an auger and adjustable compaction cylinder for a dewatering device. In one example, an auger screen is configured with a two-piece compaction zone. The first piece is a fixed compaction cylinder located inside the compaction zone. The second piece is a moveable compaction cylinder with multiple mounting locations. The primary location of the moveable compaction cylinder is an extended position, which allows for the formation of a solids plug. The secondary location of the moveable compaction cylinder is a retracted position, which eliminates the space for a solids plug to form. To this end, the retracted position locates the moveable compaction cylinder end point adjacent to the auger end point such that solids immediately enter the discharge area at the end of the auger, thereby eliminating the solids plug.

Figure 1:
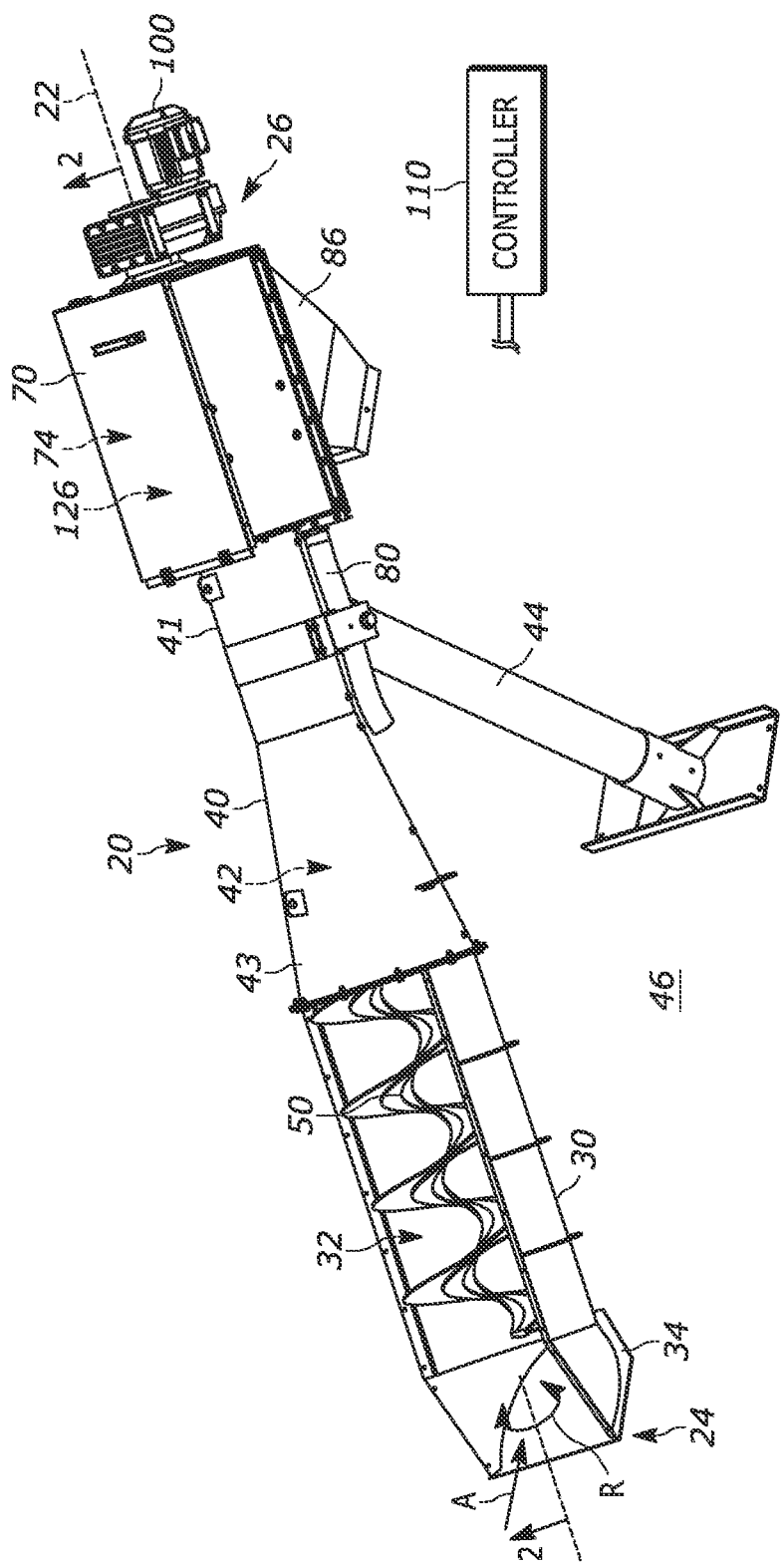
FIG. 1 is a schematic illustration of an example dewatering device.
Figure 2:
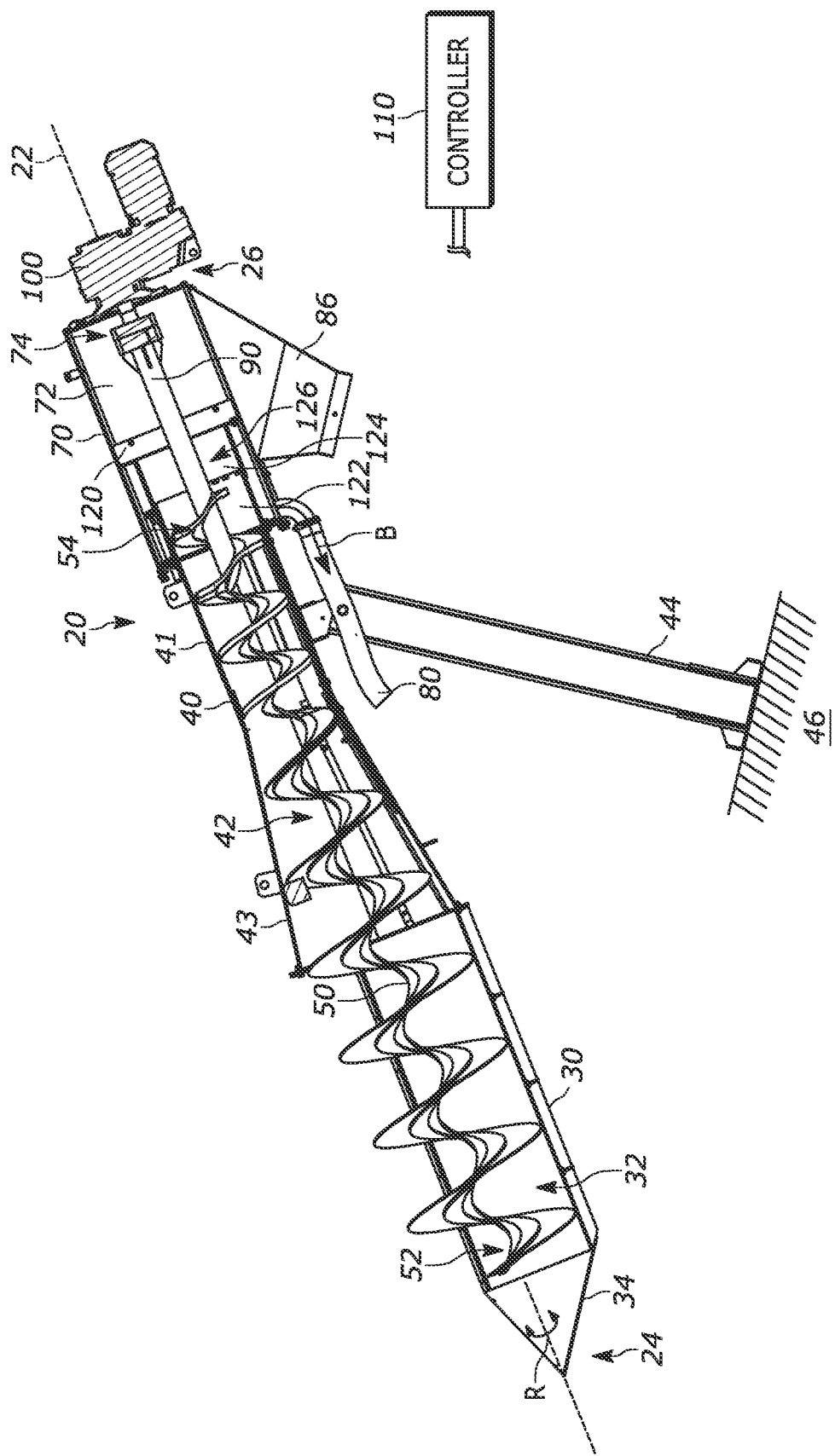
FIG. 2 is a section view of the device of FIG. 1 taken along line 2-2.

An example dewatering device 20 is shown in FIGS. 1-5B. Referring to FIGS. 1-2, the device 20 extends along a centerline 22 from a first or upstream end 24 to a second or downstream end 26. A screen basket 30 is positioned at the first end 24. The basket 30 includes a longitudinal passage 32 extending along the centerline 22 and closed at a distal end by an end cap 34. As shown, the passage 32 is visible from the top of the device 20.

A transport cylinder 40 is connected in an end-to-end manner with the basket 30 downstream thereof. The transport cylinder 40 can include a first portion 41 having a constant diameter and a second portion 43 having a diameter that increases in a direction extending towards the basket 30. The second portion 43 is positioned adjacent the basket 30. The first portion 41 is positioned downstream of the second portion 43.

The transport cylinder 40 defines a passage 42 extending entirely therethrough and along the centerline 22. The passages 32, 42 are longitudinally aligned with one another and fluidly connected. A support arm 44 is connected to the transport cylinder 40 and rests on the ground 46 for elevating the device 20 in an inclined manner above the ground.

An auger 50 extends through the basket 30 and transport cylinder 40 along the centerline 22 and is rotatable relative to the centerline in the manner R. The auger 50 includes a first end 52 positioned at the first end 24 of the device 20 within the basket 30 and spaced from the end cap 34. A second end 54 is positioned closer to the second end 26 of the device 20 within the transport cylinder 40. Consequently, the auger 50 extends through the passages 32, 42 in the basket 30 and transport cylinder 40, respectively.

The second end 54 of the auger 50 extends into a housing 70. More specifically, the housing 70 includes an inner surface 72 defining a chamber 74 for receiving the second end 54 of the auger 50 (see FIG. 3). A first outlet opening 76 extends through the first portion 41 of the transport cylinder 40 and receives a drain tube 80. A second outlet opening 84 extends through the housing 70 and receives a discharge chute 86.

A drive shaft 90 extends through the chamber 74 and is rotatably connected to the second end 54 of the auger 50. The drive shaft 90 is driven by a motor 100 connected to a controller 110. The controller 110 controls rotation of the drive shaft 90 and thereby controls rotation of the auger 50 about the centerline 22.

Figure 3:
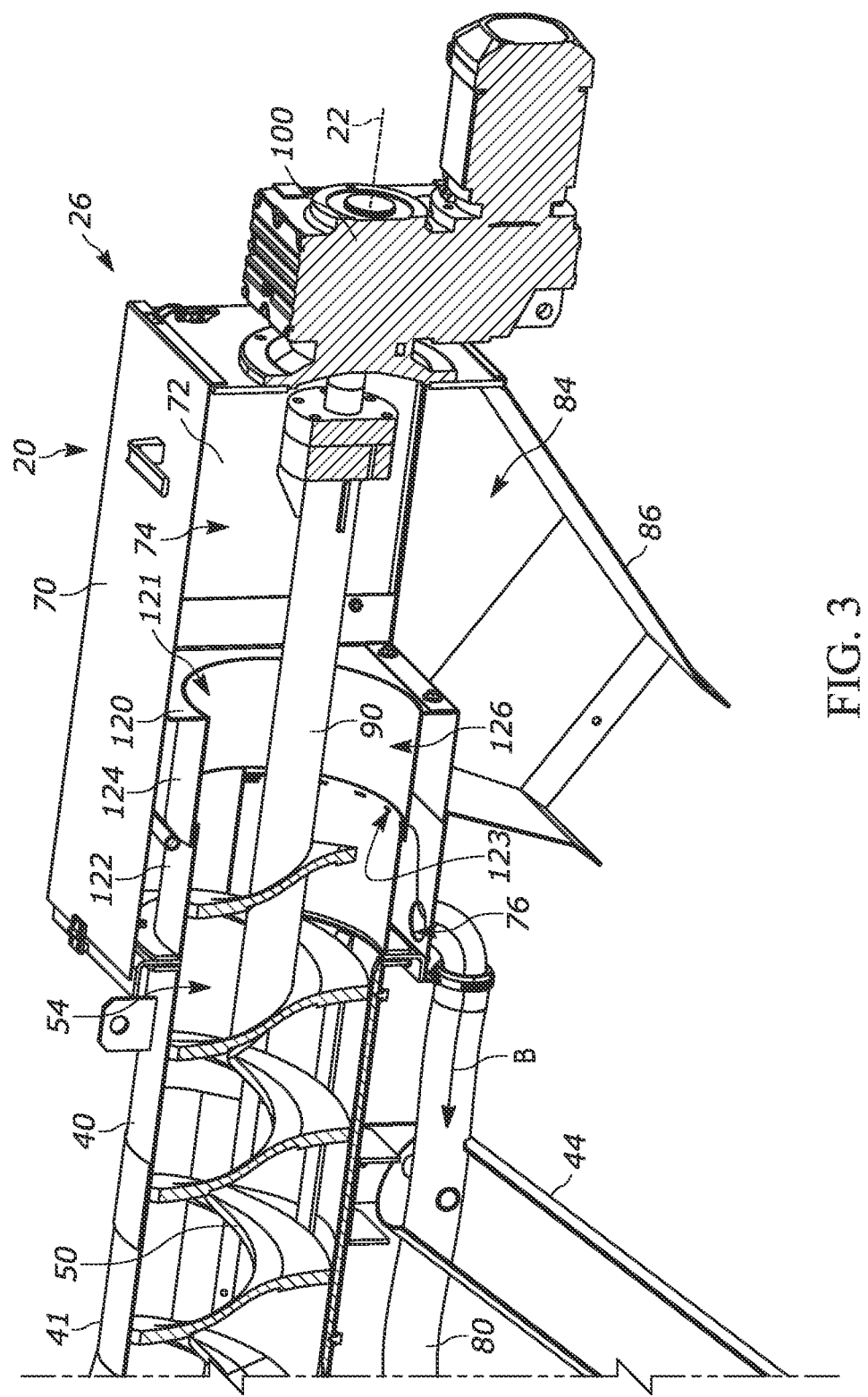
FIG. 3 is an enlarged view of a portion of FIG. 2.
Figure 4A:
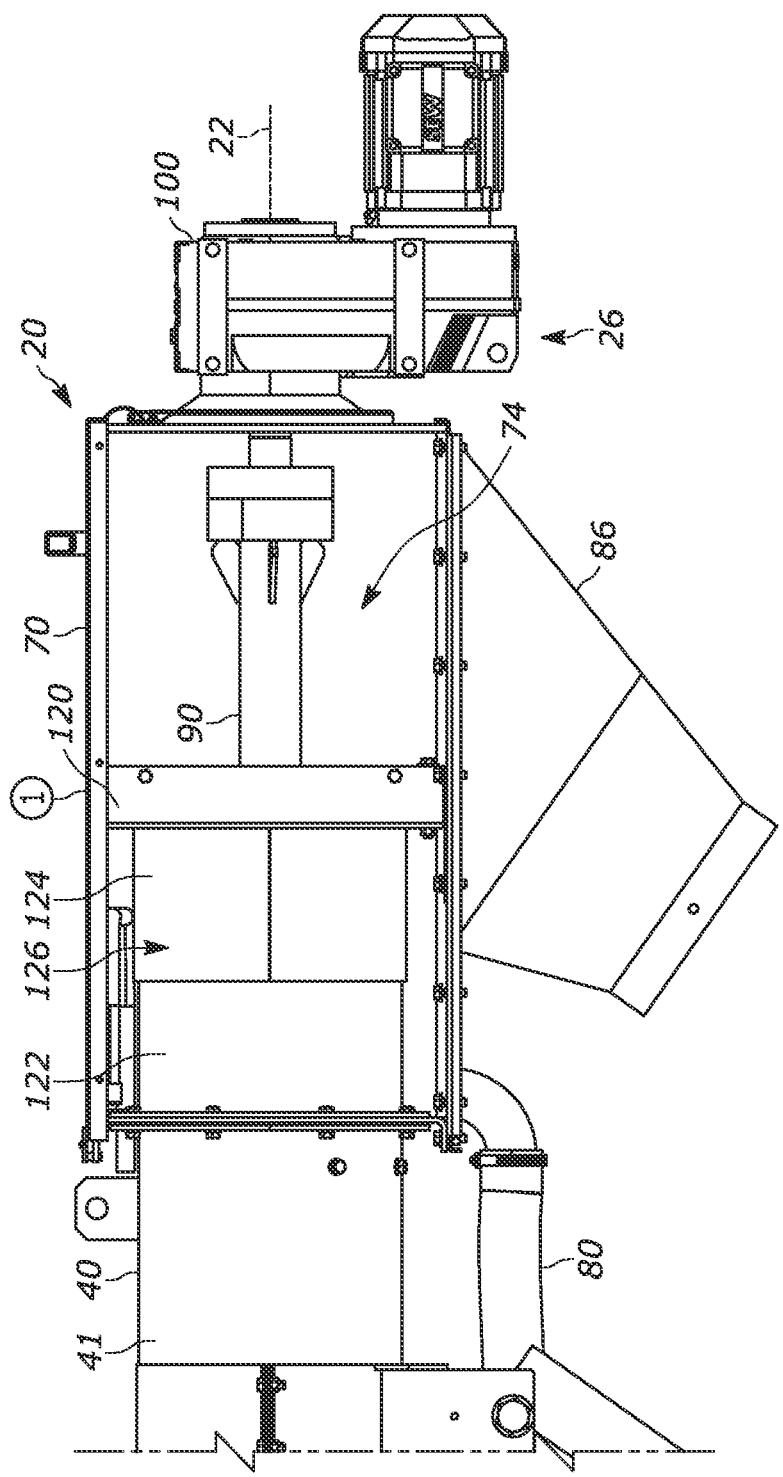
FIGS. 4A-4B are schematic illustrations of the dewatering device in an expanded condition.
Figure 4B:
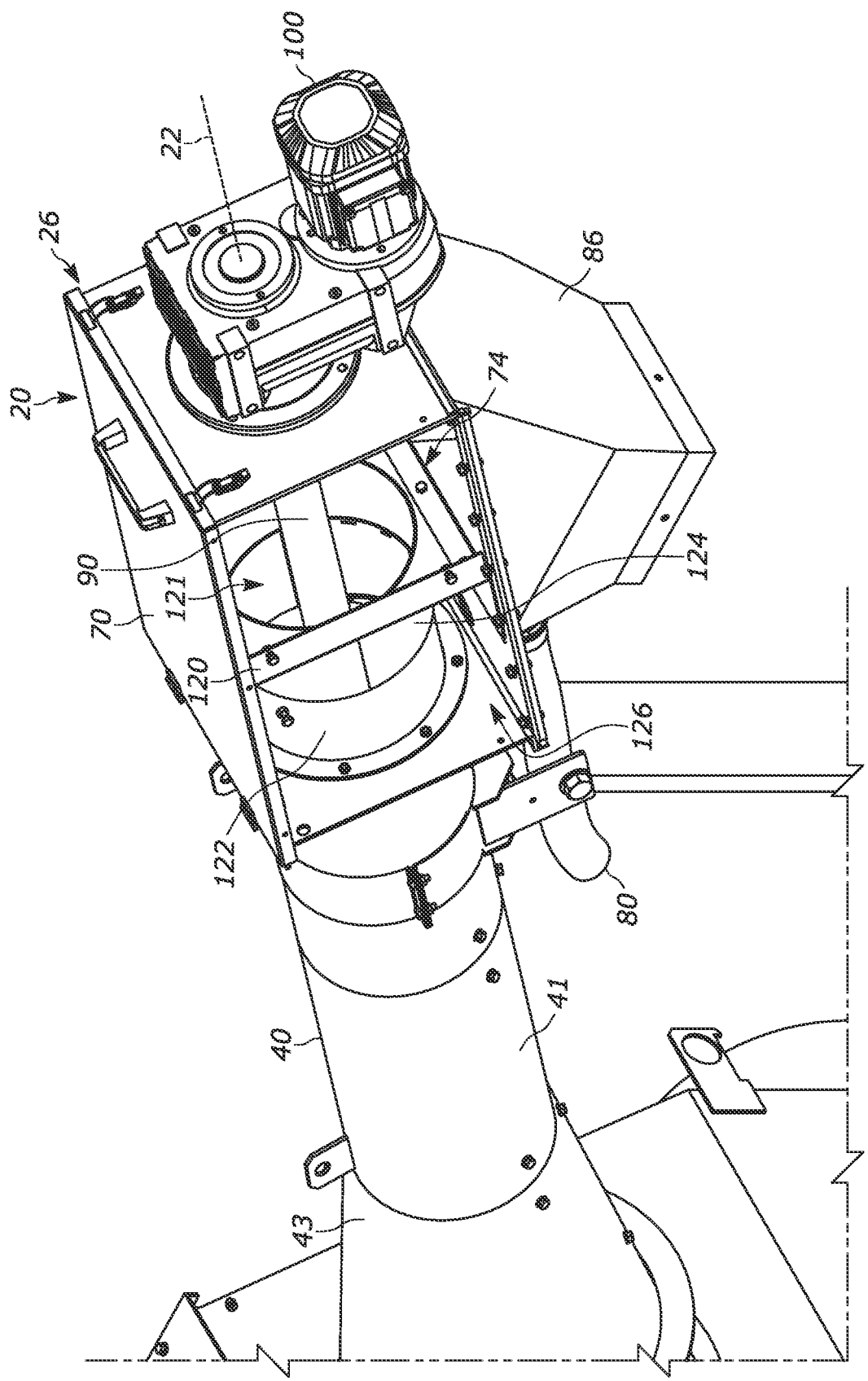

As shown in FIG. 3, a partition 120 is provided within the housing 70 and includes a generally centrally located opening 121. The partition 120 is connected to the inner surface 72 at any one of multiple, predetermined locations along the centerline 22. More specifically, the partition 120 is provided with fasteners or the like that cooperate with sets of mounting openings in the side walls of the housing 70 and corresponding with predetermined locations along the centerline 22. Consequently, the partition 120 can be fixed to the housing 70 at any one of multiple locations and therefore have different longitudinal positions within the chamber 74 and along the centerline 22.

First and second telescoping tubes 122, 124 are provided in the housing 70. The first tube 122 is fixed to the housing 70 and includes a series of openings or perforations 123 in fluid communication with the first outlet opening 76 and therefore in fluid communication with the drain tube 80. The perforations 123 can be provided along, for example, the lower 180° of the first tube 122, i.e., facing downwards towards the first outlet opening 76, and along the entire length of the first tube (not shown).

The second tube 124 is fixed to the partition 120 and slidably connected to the first tube 122 in a telescoping manner. As shown, the second tube 124 slides over the first tube 122. Perforations (not shown) can be provided along the lower 180° of the second tube 124 [facing the first outlet opening 76] and along the entire length of the second tube.

The partition 120 and tubes 122, 124 cooperate to define a press or compaction zone 126 within the housing 70 and upstream of the partition. The size/location of the compaction zone 126 is adjustable. To this end, movement of the partition 120 to different mounting locations on the housing 70 results in different degrees of telescopic movement between the tubes 122, 124. Accordingly, the size of the compaction zone 126 changes as the longitudinal position of the partition 120 changes. The further to the right (as shown) the partition 120 is secured to the housing 70 the larger the compaction zone 126, and vice versa.

In operation (see FIG. 1), the dewatering device 20 can provide an adjustable degree of compaction to debris screened from a liquid stream with entrained solids/debris. The liquid stream enters the screen basket 30 at the first end 24 of the device 20 in the manner indicated by the arrow A. As the auger 50 is rotated R by the motor 100 (controlled by the controller 110), the entrained solids/debris are drawn out of (i.e., screened from) the liquid stream and continue up the auger towards the second end 26 of the device 20. The screened debris is conveyed up from the screen basket 30 through the inclined transport cylinder 40 to the compaction zone 126 within the housing 70.

To achieve compaction of the entrained solids/debris, the downstream end of the auger 50 terminates before the upstream end of the compaction zone 126. This configuration allows solids to accumulate downstream of the auger 50 and form a solids plug within the compaction zone 126 against/upstream of the partition 120. In other words, the second end 54 of the auger 50 is spaced longitudinally from the partition 120 and, thus, solids are capable of collecting between the second end 54 and the partition to form the solids plug. The opening 121 is sized to substantially prevent passage of the solids plug therethrough until back pressure on the solids plug reaches a predetermined amount.

Prior to reaching the predetermined amount, as new solids are conveyed into the solids plug, the resistance from the solids plug/partition 120 causes screenings to compact. As a result, pressate water and/or "soft organics" are released from the compacted solids and pass through the perforations 123 in the first tube 122 (and any perforations in the second tube 124) to the drain tube 80. This is indicated by the arrow B in FIGS. 2 and 3. Once the predetermined back pressure amount is reached or exceeded, the solids plug passes through the opening 121 and enters the discharge zone/chute 86.

As noted, the partition 120 can be mounted to different positions within the housing 70 to adjust the degree of telescoping between the fixed tube 122 and the tube 124 connected to the partition and thereby change the length of the compaction zone 126. To this end, the partition 120 can be mounted in a first or extended position indicated at ①  in FIG. 4A (see also FIG. 4B). This represents the maximum size of the compaction zone 126 because the second tube 124 is fully telescoped outward from the first tube 122. In this position, the compaction zone 126 is at its maximum size and large enough to allow the solids plug to form.

Figure 5A:
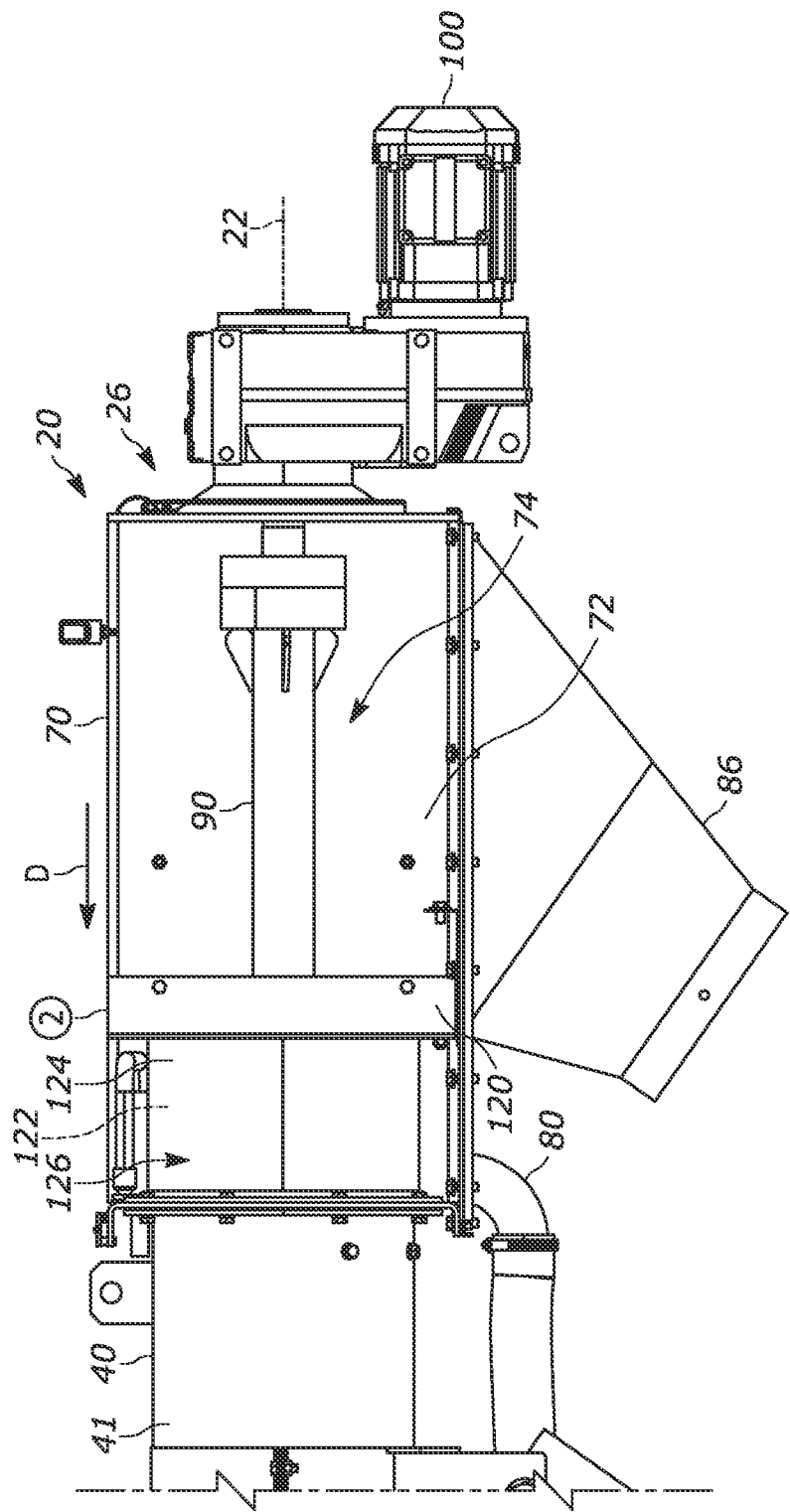
FIGS. 5A-5B are schematic illustrations of the dewatering device in a retracted condition.
Figure 5B:
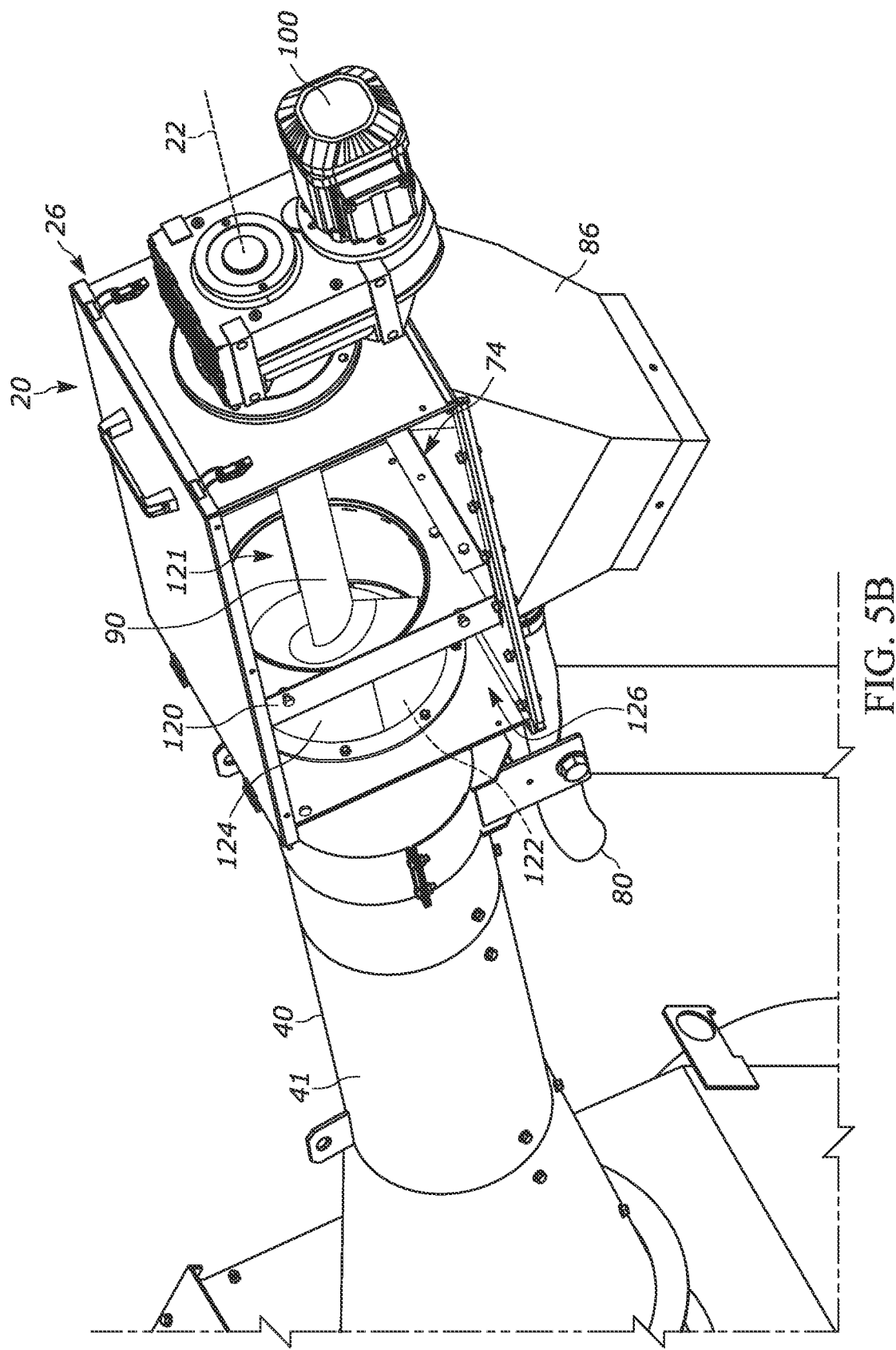

The partition 120 can also be mounted in a second or retracted position indicated at ② in FIG. 5A (see also FIG. 5B). This represents the minimum size of the compaction zone 126 because the second tube 124 is fully collapsed or retracted over the first tube 122. In one example, the second tube 124 completely covers the first tube 122 when in the retracted position and the partition 120 is positioned adjacent the second end 54.

In the retracted position, the compaction zone 126 is too small to allow the solids plug to form. Consequently, the solids pass through the opening 121 in the partition 120 and to the discharge chute 86 without forming a solids plug. Eliminating the solids plug reduces the likelihood of the stringy solids from plugging the discharge zone. In other words, the nature of the solids within the water to be treated can dictate when the compaction zone 126 is minimized to prevent solids plug formation and when it is sized sufficient to allow solids plugs to form. Regardless, pressate and/or soft organics are capable of draining out of the tubes 122, 124 whether the tubes are extended or retracted.

It will be appreciated that the partition 120 can be mounted in any longitudinal location between the extended and retracted positions shown. To this end, the partition 120 can have or be attached to structure that enables it to slide in longitudinal slots (not shown) in the housing 70. This would allow the partition 120 to be fixed in place in any location between the extended and retracted positions. It will also be appreciated that the compaction zone 126 can be configured to generate a solids plug without requiring that the partition 120 be at the fully extending position.

The present invention is advantageous in that it provides a dewatering device that allows an auger screen to include compaction, but also provides a simple method to eliminate or adjust the solids plug without having to permanently modify the compaction cylinder or auger by welding, cutting, or drilling.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A dewatering device for removing entrained solids and debris from a liquid stream, comprising:
   a housing defining a chamber;
   an auger having a first end positioned outside the chamber and a second end positioned inside the chamber;
   a compaction zone comprising:

a first tube fixed to the housing;

a second tube slidably mounted on the first tube; and a partition secured to the second tube, the partition having a first longitudinal position in the housing allowing a solids plug to form in the compaction zone and a second longitudinal position in the housing preventing the solids plug from forming in the compaction zone, wherein the partition is downstream of the auger in both the first longitudinal position and the second longitudinal position.

2. The dewatering device recited in claim 1, wherein the first and second tubes telescope with one another to allow the partition to reach the first and second longitudinal positions.

3. The dewatering device recited in claim 1, wherein the partition is spaced longitudinally from the auger by the second tube when in the first longitudinal position.

4. The dewatering device recited in claim 1, wherein the partition is positioned adjacent to the auger when in the second longitudinal position.

5. The dewatering device recited in claim 1, wherein the second tube completely covers the first tube when in the second longitudinal position.

6. The dewatering device recited in claim 1, wherein the housing includes mounting holes corresponding with the first and second longitudinal positions, the partition being secured at the mounting holes by at least one fastener.

7. The dewatering device recited in claim 1, wherein at least one of the first tube and the second tube includes perforations fluidly connected to a drain.

8. The dewatering device recited in claim 1, wherein the solids plug is forced through an opening in the partition to a discharge chute in response to back pressure on the solids plug.

9. The dewatering device recited in claim 1, wherein the first tube extends within the second tube.

10. The dewatering device recited in claim 1, wherein a slot extends longitudinally along the housing for allowing the second tube to be fixed at either the first or second longitudinal positions.

11. The dewatering device recited in claim 1, wherein at least a portion of the compaction zone is downstream of the auger at a discharge end of the dewatering device.

12. The dewatering device recited in claim 8, wherein the discharge chute extends below the compaction zone and the partition is longitudinally aligned with the discharge chute.

13. The dewatering device recited in claim 1, wherein the first end of the auger is positioned upstream of the second end and the first end has a diameter that is greater than a diameter of the second end.

14. The dewatering device recited in claim 1, wherein a shaft is connected to the auger and extends through the partition for rotating the auger while the auger does not extend through the partition.

* * * * *